(12) United States Patent
Belharouak et al.

(10) Patent No.: US 11,362,333 B2
(45) Date of Patent: Jun. 14, 2022

(54) COBALT-FREE LAYERED OXIDE CATHODES

(71) Applicant: UT-Battelle, LLC, Oak Ridge, TN (US)

(72) Inventors: Ilias Belharouak, Oak Ridge, TN (US); Marissa Wood, Oak Ridge, TN (US); Chengyu Mao, Oak Ridge, TN (US); Jianlin Li, Oak Ridge, TN (US); Jagjit Nanda, Oak Ridge, TN (US); Nitin Muralidharan, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 244 days.

(21) Appl. No.: 16/750,171

(22) Filed: Jan. 23, 2020

(65) Prior Publication Data
US 2020/0235390 A1 Jul. 23, 2020

Related U.S. Application Data

(60) Provisional application No. 62/795,725, filed on Jan. 23, 2019.

(51) Int. Cl.
*H01M 4/525* (2010.01)
*H01M 4/62* (2006.01)
(Continued)

(52) U.S. Cl.
CPC ............ *H01M 4/525* (2013.01); *C01G 53/42* (2013.01); *H01M 4/131* (2013.01); *H01M 4/366* (2013.01); *H01M 4/62* (2013.01); *H01M 10/0525* (2013.01); *H01M 10/0567* (2013.01); *H01M 10/0568* (2013.01); *H01M 10/0569* (2013.01);
(Continued)

(58) Field of Classification Search
CPC ........ H01M 10/0525; H01M 10/0567; H01M 10/0568; H01M 10/0569; H01M 2004/021; H01M 2004/028; H01M 2300/0025; H01M 2300/0037; H01M 4/131; H01M 4/1391;
(Continued)

(56) References Cited

U.S. PATENT DOCUMENTS 7,510,803 B2  3/2009 Adachi et al.
7,524,439 B2  4/2009 Otsuki et al.
(Continued)

FOREIGN PATENT DOCUMENTS

CN   104103842 A   10/2014
EP    0918041 A1    5/1999
(Continued)

OTHER PUBLICATIONS

Sun, Yang-Kook, et al. "Cobalt-free nickel rich layered oxide cathodes for lithium-ion batteries." ACS applied materials & interfaces 5.21 (2013): 11434-11440.
(Continued)

*Primary Examiner* — Carlos Barcena
(74) *Attorney, Agent, or Firm* — Warner Norcross + Judd LLP

(57) ABSTRACT

A cathode and a battery providing the cathode is provided. The cathode comprises a lithium metal oxide. The lithium metal oxide comprises nickel, aluminum, and iron. The lithium metal oxide is substantially free of cobalt. The battery comprises an anode, the cathode, a separator, and an electrolyte.

18 Claims, 6 Drawing Sheets

(51) Int. Cl.
  *H01M 4/131* (2010.01)
  *H01M 4/36* (2006.01)
  *H01M 10/0567* (2010.01)
  *H01M 10/0568* (2010.01)
  *H01M 10/0569* (2010.01)
  *H01M 10/0525* (2010.01)
  *C01G 53/00* (2006.01)
  *H01M 4/02* (2006.01)

(52) U.S. Cl.
  CPC ...... *C01P 2002/72* (2013.01); *C01P 2002/77* (2013.01); *C01P 2004/03* (2013.01); *C01P 2004/24* (2013.01); *C01P 2004/32* (2013.01); *C01P 2004/84* (2013.01); *C01P 2006/40* (2013.01); *H01M 2004/021* (2013.01); *H01M 2004/028* (2013.01); *H01M 2300/0025* (2013.01)

(58) Field of Classification Search
  CPC ...... H01M 4/366; H01M 4/485; H01M 4/525; H01M 4/62
  See application file for complete search history.

(56) References Cited

U.S. PATENT DOCUMENTS

| | | |
|---|---|---|
| 2002/0187372 A1 | 12/2002 | Hall et al. |
| 2004/0091779 A1* | 5/2004 | Kang ................ C01G 45/1228 429/231.1 |
| 2010/0028784 A1* | 2/2010 | Pham ................ H01M 10/052 429/332 |
| 2015/0072225 A1 | 3/2015 | Ishiji et al. |
| 2019/0190019 A1 | 6/2019 | Lee et al. |

FOREIGN PATENT DOCUMENTS

| | | | |
|---|---|---|---|
| JP | 2005219978 A * | 8/2005 | ............ C01G 53/00 |
| WO | 2018/023527 A1 | 2/2018 | |

OTHER PUBLICATIONS

International Search and Written Opinion associated with PCT/US2020/014715 dated Sep. 14, 2020.

* cited by examiner

COBALT-FREE LAYERED OXIDE CATHODES

CROSS-REFERENCE TO RELATED APPLICATIONS

This application claims the benefit of U.S. Provisional Application 62/795,725, filed Jan. 23, 2019, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE DISCLOSURE

The present disclosure relates to cathodes comprising lithium metal oxides with the lithium metal oxides comprising nickel, aluminum, and iron. The lithium metal oxides are substantially free of cobalt.

BACKGROUND OF THE DISCLOSURE

Electrification of technologies among various industries is limited by the cost, capacity, and stability of the batteries, such as Li-ion batteries. Increasing the energy density of Li-ion batteries is critical for expanding the adoption of electric vehicles. Recent efforts have focused on improving cathode materials to generate stable, low-cost, positive electrodes with high capacity. Lithium cobalt oxide ($LiCoO_2$) was the first layered transition metal oxide to be commercialized and is still used in many applications. However, cobalt is expensive, and the relatively lower cost of nickel led to the pursuit of lithium nickel oxide ($LiNiO_2$).

Lithium nickel oxide ($LiNiO_2$) proved difficult to synthesize and suffered from structural changes that resulted in poor cyclability. However, doping with various combinations of aluminum, cobalt, and manganese was found to significantly improve the stability and electrochemical performance. Although aluminum is electrochemically inactive, adding it to the material along with cobalt (Co) reduces the amount of cation mixing in the lithium (Li) layer and stabilizes the layered structure, preventing phase transitions and $O_2$ release that can cause thermal runaway. Cobalt (Co) also improves rate capability by increasing electrical conductivity, while manganese (Mn) leads to better thermal stability. Consequently, two new promising cathode materials were developed as a result of these advances: lithium nickel cobalt aluminum oxide (NCA, $LiNi_xCo_yAl_zO_2$, $x+y+z=1$) and lithium nickel manganese cobalt oxide (NMC, $LiNi_xMn_yCo_zO_2$, $x+y+z=1$). However, both materials still contain cobalt (Co), which is expensive.

Accordingly, there remains a need for cathodes that are substantially free of cobalt (Co).

SUMMARY OF THE DISCLOSURE

A cathode is provided. The cathode comprises a lithium metal oxide. The lithium metal oxide comprises nickel, aluminum, and iron. The lithium metal oxide is substantially free of cobalt. A battery is also provided. The battery comprises an anode, the cathode, a separator, and an electrolyte.

In one embodiment, the cathode comprises a lithium metal oxide having a formula according to Formula I:

$$Li_{1+w}Ni_xFe_yAl_zO_2 \qquad \text{I}$$

wherein $0 \leq w \leq 0.05$, $0 < x < 1$, $0 < y \leq 0.2$, $0 < z \leq 0.2$, $x+y+z=1$ (commonly referred to as NFA).

The cathode is considered nickel-rich and is substantially free of cobalt (Co). In addition to nickel (Ni), the cathode comprises iron (Fe), which is generally a cheaper and more environmentally friendly element. It is believed that this cathode retains the stability provided by aluminum (Al) and the high capacity offered by nickel (Ni), while lowering the cost and increasing the capacity (~220 mAh/g) through the substitution of cobalt (Co) with iron (Fe). NFA exhibits improved electrochemical performance relative to conventional cathodes free of iron (Fe) and comprising cobalt (Co).

These and other features and advantages of the present invention will become apparent from the following description of the invention, when viewed in accordance with the accompanying drawings and appended claims.

BRIEF DESCRIPTION OF THE DRAWING

Other advantages of the disclosed subject matter will be readily appreciated, as the same becomes better understood by reference to the following detailed description when considered in connection with the accompanying drawings wherein.

DETAILED DESCRIPTION

Figure 1A:
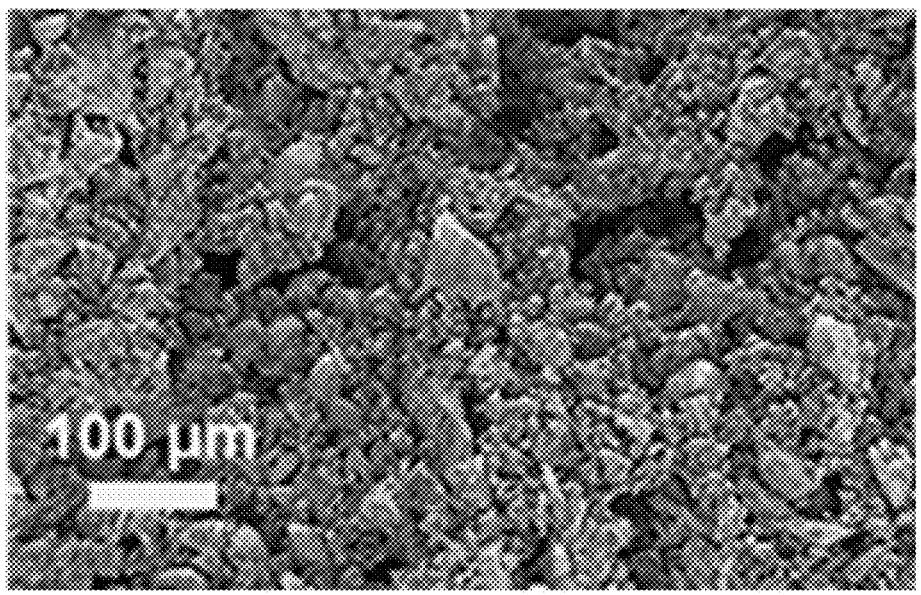
FIGS. 1A and 1B are scanning electron micrographs of one embodiments of a lithium metal oxide.

A cathode comprising a lithium metal oxide, and a battery comprising the same, is provided. The cathode, and battery comprising the same, may be utilized to expand electrification of technologies among various industries by reducing costs, improving capacity, and improving stability. Examples of suitable uses include, but are not limited to, on-board batteries for electric vehicles (EV), energy storage systems (ESS), behind-the-meter energy storage, charging stations, and uninterruptable power supply (UPS) systems.

The lithium metal oxide of the cathode comprises nickel (Ni), aluminum (Al), and iron (Fe). The lithium metal oxide is substantially free of cobalt (Co). The phrase "substantially free" as utilized herein with reference to cobalt (Co) means that the lithium metal oxide comprises cobalt (Co) in an amount of less than 0.1 mol %, optionally less than 0.01 mol %, or optionally less than 0.001 mol %, based on a total weight of the lithium metal oxide. In these and other embodiments, the cathode comprising iron (Fe) and substantially free of cobalt (Co) exhibits an increase in capacity as compared to a conventional cathode free of iron (Fe) and comprising cobalt (Co). Further, without being bound by theory, it is believed that the cathode comprising nickel (Ni) and iron (Fe) provides an increased capacity to the cathode relative to conventional cathodes comprising cobalt (Co) and nickel (Ni). Further, it is believed that the cathode comprising aluminum (Al) and nickel (Ni) exhibits improved stability relative to conventional cathodes free of aluminum (Al).

In these and other embodiments, the lithium metal oxide has a formula according to Formula I:

$$Li_{1+w}Ni_xFe_yAl_zO_2 \qquad\qquad I;$$

wherein $0 \leq w \leq 0.05$, $0 < x < 1$, $0 < y \leq 0.2$, $0 < z \leq 0.2$, and $x+y+z=1$ (commonly referred to as NFA). The variable w may be a number from 0 to 0.05, optionally from 0 to 0.025, or optionally from 0 to 0.01. The variable x may be a number from greater than 0 to 1, optionally from greater than 0.5 to 1, or optionally from greater than 0.7 to 1. The variable y may be a number from greater than 0 to 0.2, optionally from greater than 0 to 0.15, optionally from greater than 0 to 0.1, or optionally from greater than 0 to 0.05. The variable z may be a number from greater than 0 to 0.2, optionally from greater than 0 to 0.15, optionally from greater than 0 to 0.1, or optionally from greater than 0 to 0.05. In these and other embodiments, the lithium metal oxide has a formula according to Formula II:

$$LiNi_{0.8}Fe_{0.1}Al_{0.1}O_2 \qquad\qquad II.$$

The iron (Fe) of the lithium metal oxide may selected from the group of $Fe^{2+}$, $Fe^{3+}$, and combinations thereof. In various embodiments, the iron (Fe) of the lithium metal oxide is trivalent iron ($Fe^{3+}$). The aluminum (Al) of the lithium metal oxide is selected from the group of $Al^{3+}$. In certain embodiments, the aluminum (Al) of the lithium metal oxide comprises trivalent aluminum ($Al^{3+}$). To this end, while increasing nickel (Ni) content of the cathode can result in an improvement in capacity, is believed that the electrochemical performance of the cathode is further improved by substituting a portion of the nickel (Ni) with trivalent iron ($Fe^{3+}$) and trivalent aluminum ($Al^{3+}$), which have similar ionic radii to trivalent nickel ($Ni^{3+}$) and provide improved structural stability and cycle life relative to a conventional cathode free of trivalent iron ($Fe^{3+}$) and trivalent aluminum ($Al^{3+}$). In particular, trivalent iron ($Fe^{3+}$) has an ionic radii of 0.55 angstroms (Å) and trivalent aluminum ($Al^{3+}$) has an ionic radii of 0.54 Å while trivalent nickel ($Ni^{3+}$) has an ionic radii of 0.56 Å.

In other embodiments, the lithium metal oxide comprises nickel (Ni) and manganese (Mn) and is substantially free of cobalt (Co) (commonly referred to as LNMO). The LNMO may have a formula according to Formula IV:

$$LiNi_{0.5}Mn_{1.5}O_4 \qquad\qquad IV.$$

In various embodiments, the lithium metal oxide is further defined as a layered lithium metal oxide. In other embodiments, the lithium metal oxide is further defined as a spinel lithium metal oxide. It is to be appreciated that the lithium metal oxide may phase transform between layered and spinel phases during cycling processes. In other embodiments, the spinel lithium metal oxide may be ordered or disordered. It is to be appreciated that the cathode may comprise a combination of lithium metal oxides in the layered phase and the spinel phase. Further, it is to be appreciated that the cathode may comprise a combination of spinel lithium metal oxides that are ordered and disordered.

In various embodiments, the cathode comprises a primary particle having a surface with the primary particle comprising the lithium metal oxide. The primary particle may have a spherical configuration or a hexagonal-shaped nano-plate configuration. However, it is to be appreciated that the primary particle may have any configuration known in the art. Further, the cathode may comprise a combination of primary particles having a spherical configuration and a hexagonal-shaped nano-plate configuration. The primary particle having the spherical configuration may have a particle size in an amount of from about 1 to about 100 micrometers (μm), optionally from about 1 to about 50 μm, or optionally from about 10 to about 20 μm. The primary particle having the hexagonal-shaped plate configuration may have a thickness in an amount of from about 1 to about 200 nanometer (nm), optionally from about 1 to about 100 nm, or optionally from about 40 to about 60 nm. The primary particle having the hexagonal-shaped plate configuration may have a lateral length in an amount of from about 10 to about 1000 micrometers (μm), optionally from about 1 to about 50 μm, or optionally from about 10 to about 20 μm.

In these and other embodiments, the cathode comprises a secondary particle comprising the primary particle. In embodiments when the primary particle has the hexagonal-shaped plate configuration, the cathode may exhibit improved lithium ion diffusion through the primary particles relative to a primary particle that does not have the hexagonal-shaped plate configuration.

Further, a decrease in particle size of the primary particle may provide an improvement to lithium ion diffusion through the primary particles. However, as particle size decreases, total surface area of the primary particles increases for a given volume, which can lead to the presence of parasitic reactions due to the increase in total surface area of the primary particles exposed to high voltage. In various embodiments, the primary particles comprise a coating to reduce the occurrence of the parasitic reactions thereby improving cycle life of the cathode.

In these and other embodiments, the primary particle comprises the coating disposed overlying the surface of the primary particle. It is to be appreciated that the primary particle may comprise one or more intervening layers between the coating and the surface of the primary particle. In certain embodiments, the coating comprising an oxide selected from the group of silicon dioxide, zirconium dioxide, titanium oxide, and a combination thereof. In various embodiments, the coating overlying the primary particle is substantially uniform to reduce the occurrence of interfacial resistances thereby improving lithium ion diffusion through the primary particles. The phrase "substantially uniform" as utilized herein means that the thickness of the coating at any point overlying the surface of the primary particle is within 5%, optionally within 1%, or optionally within 0.1%, of the thickness of the coating at any other point overlying the surface of the primary particle. The coating may be present overlying the primary particle in an amount of from about 0.01 to about 10 wt. %, optionally from about 0.1 to about 5 wt. %, or optionally from about 0.5 to about 3 wt. %, based on a total weight of the primary particle.

In certain embodiments, the lithium metal oxide is formed from a lithium metal oxide composition (also commonly referred to as a cathode slurry). The lithium metal oxide composition may comprise a binder and a solvent. The lithium metal oxide composition may further include a conductive agent.

The binder may comprise polyamideimide, polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, lithium polyacrylate, lithium polymethacrylate, ethylene-propylene diene monomer (EPDM), sulfonated EPDM, styrene butadiene rubber, fluoride rubber, and various copolymers, or the like. However, any other binder commonly used in the art may also be used. The solvent may comprise butanol, acetonitrile, acetone, methanol, ethanol, N-methyl-2-pyrrolidone (NMP), water, or the like. However, any other solvent commonly used in the art may also be used. The conductive agent may comprise carbon black, carbon fiber, graphite, or the like. However, any other conductive agent commonly used in the art may also be used. The amounts of the cathode active material, the binder, the solvent, and the conductive agent are the same as those commonly used in lithium ion batteries.

The lithium metal oxide composition may be applied to various co-precipitation and sol-gel methods to form a precipitate, as commonly used in the art. The precipitate may then be fired with an amount of $Li_2CO_3$ at high temperature to form the lithium metal oxide. The pH, concentration of the feeds, temperature, and maturation time may be adjusted to control particles morphology, size, and porosity of the lithium metal oxide.

The lithium metal oxide may be directly coated on a metallic current collector and dried to form the cathode. Alternatively, the lithium metal oxide may be cast on a separate support, and then a film separated from the support is laminated on the metallic current collector to form the cathode.

A method of forming the lithium metal oxide is also provided. In various embodiments, a sol-gel method is utilized to form the lithium metal oxide. A co-precipitation process may be employed in a continuous stirred tank reactor (CSTR). The method comprises dissolving lithium, nickel, aluminum, and iron in an aqueous solvent to form a solution. The aqueous solvent may comprise deionized water. The solution may further comprise an acid (e.g. citric acid). The acid may be present in the solution in weight ratio of transition metal to acid of from about 1:2 to about 2:1.

Figure 1B:
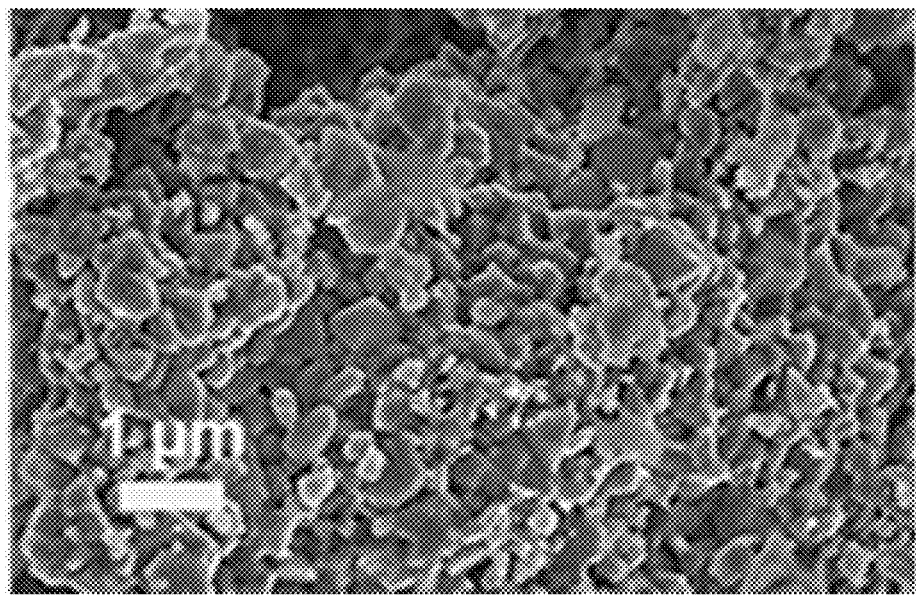

The method further comprises heating the solution to a first temperature to form a gel. The first temperature may be from 40 to 100° C., optionally 45 to 80° C., or optionally 50 to 70° C. The solution may be heated at the first temperature to obtain a clear gel. The method further comprises evaporating the aqueous solvent from the gel to form a precursor powder. The method further comprises heating the precursor powder to a second temperature, different than the first temperature, for calcinating the precursor powder to form the lithium metal oxide. The second temperature may be from 600 to 900° C., optionally 650 to 850° C., or optionally 700 to 800° C. The precursor powder may be heated at the second temperature in the presence of oxygen. Scanning electron micrographs of the lithium metal oxide show primary particles of the lithium metal oxide forming secondary aggregates which is a characteristic of such powders synthesized using a sol-gel process (see FIGS. 1A and 1B).

In an exemplary embodiment, the lithium metal oxide may formed from the transition metal sources in the form of sulfates, nitrates or chlorides which may be pumped into a reaction vessel containing a solution of ammonia and water. A base solution containing appropriate amounts of NaOH and ammonia may be added to precipitate the hydroxide precursor. pH of the process and stirring speed may be maintained at a constant value and may be continuously monitored throughout the process. The lithium metal oxide may have three elements which precipitate at different pH values as given by their solubility product constants (Ksp), as provided in Table I below.

TABLE I

| Equilibrium Reaction | Ksp | pH (begin to precipitate) |
|---|---|---|
| $Ni^{2+} + 2OH^- = Ni(OH)_2$ | $2.00 \times 10^{-15}$ | 6.20 |
| $Fe^{2+} + 2OH^- = Fe(OH)_2$ | $1.58 \times 10^{-15}$ | 7.01 |
| $Fe^{2+} + 3OH^- = Fe(OH)_3$ | $1.31 \times 10^{-20}$ | 4.1 |
| $Al^{3+} + 3OH^- = Al(OH)_3$ | $4.57 \times 10^{-33}$ | 2.1 |

Due to the lower $K_{sp}$ of $Al(OH)_3$ compared to $Ni(OH)_2$, $Fe(OH)_2$ and $Fe(OH)_3$, controlling the co-precipitation of $Ni^{2+}$, $Fe^{2+}$ or $Fe^{3+}$ and $Al^{3+}$ simultaneously may be challenging. To overcome this challenge, $AlO_2^-$ may be employed as the Al source, which hydrolyses into $Al(OH)_3$ under appropriate pH conditions, ensuring the simultaneous co-precipitation of $Ni^{2+}$, $Fe^{2+}$ and $Al^{3+}$.

The $Ni_{0.8}Fe_xAl_y(OH)_2$ precursor powder may be filtered then washed with deionized water several times until the pH of the filtrate is close to 7.0. After sieving, powders with an average particle size of 10 μm may be used for further analysis. The filtered powder may be dried at 120° C. overnight and then fired with appropriate amount of $Li_2CO_3$ at temperatures between 700° C. and 750° C. for varying periods of time in oxygen atmospheres to form $Li_{1+w}Ni_xFe_{y-}Al_zO_2$.

Scanning electron micrographs of the co-precipitated precursor powders and the subsequently calcined cathode material exhibit spherical morphology which may be retained after calcination to form the final cathode material. The final material comprises of primary particles (100-400 nm) aggregated to form secondary spherical particles (5-15 μm). This co-precipitation process in a CSTR can yield cathode materials with good spherical morphology and in large quantities (~500 g).

X-Ray diffractogram may show the obtained NFA cathode material with minimal impurities and good ordering with lowered cation mixing. The electrochemical performance of the co-precipitated NFA was assessed using charge/discharge measurements. The obtained cathode material delivered good capacities (~180 mAh/g at 0.05 C) when tested between the voltage range of 3V to 4.5V.

Figure 2:
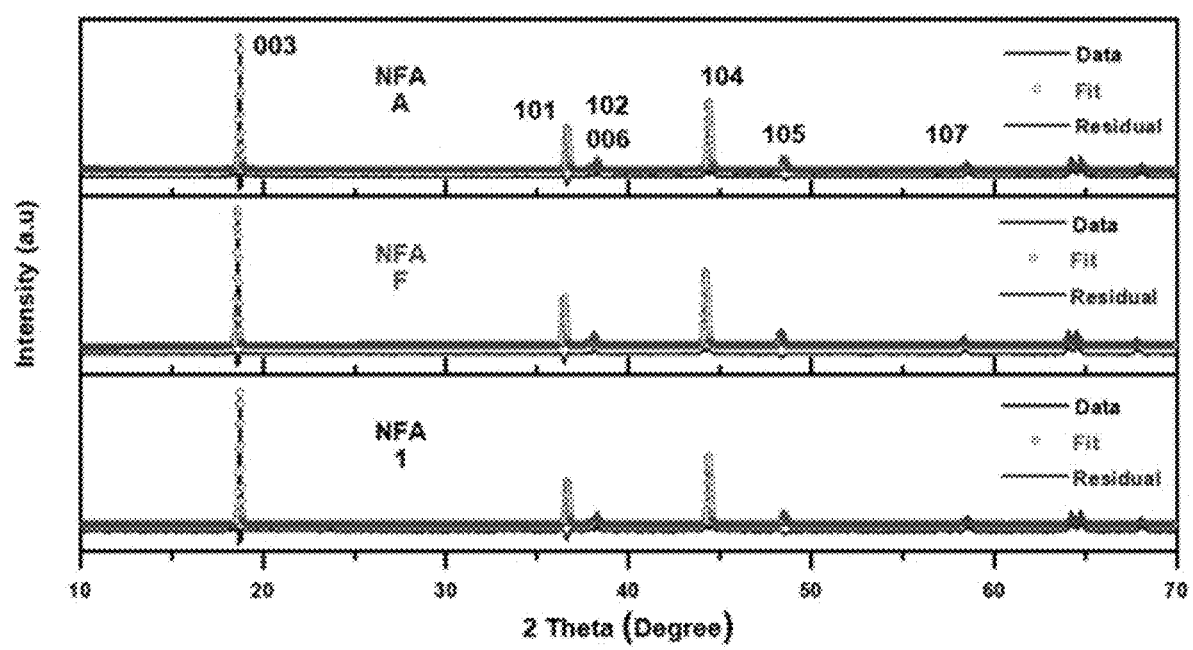
FIG. 2 are diffractogram of various embodiments of the lithium metal oxide of FIG. 1.

As shown in FIG. 2, NFA-based cathodes with varying amounts of iron and aluminum may exhibit phase purity with well-ordered crystal structures in the R-3m space group. The observed diffraction patterns may be consistent with the layered pure phase α-$NaFeO_2$. An important parameter for nickel rich class of cathodes may be the extent of cation mixing which may be characterized by the presence of some Ni2+ ions in the Li+ layer owing to the similarity in their ionic radii. This parameter can be assessed using the ratio between the intensities of (003) and (104) peaks observed in the diffractograms of FIG. 2. The NFA-based cathodes with varying amounts of iron and aluminum may exhibit minimal cation mixing characterized by the high (003)/(104) ratio (>1.5 for all the variants).

Figure 3:
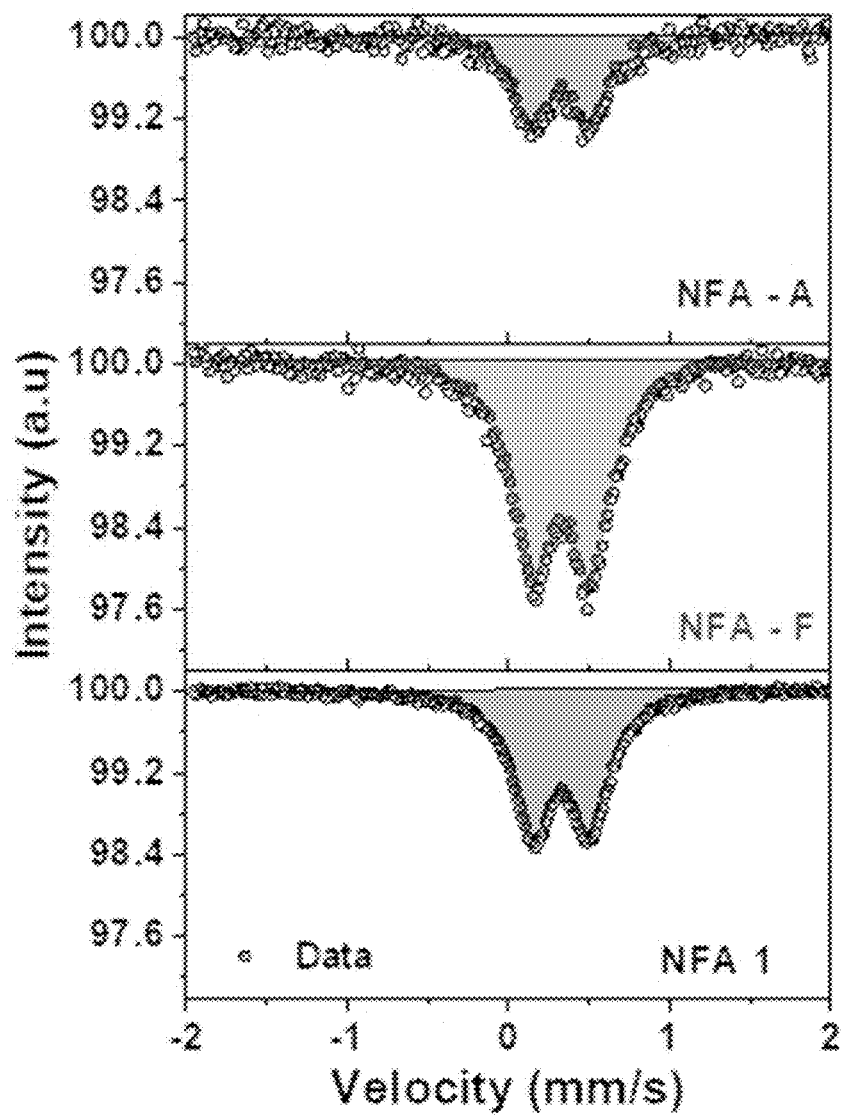
FIG. 3 are spectrograms of various embodiments of the lithium metal oxide of FIG. 1.

As shown in FIG. 3, the NFA-based cathodes with varying amounts of iron and aluminum being analyzed with Mossbauer spectroscopy may exhibit a symmetric doublet which may be fitted using a single component which may indicate one iron site. Moreover, this may also indicates that the NFA powders are paramagnetic confirming the absence of any magnetic iron impurities at room temperature. The obtained isomershifts may indicate the presence of iron with +3 high spin oxidation state. Also, quadruple splitting values for the three variants may indicate that the iron is present in an asymmetric environment. The absence of other peaks in the spectra may indicate iron solely in +3 state without any +2 or +4 impurities.

Figure 4:
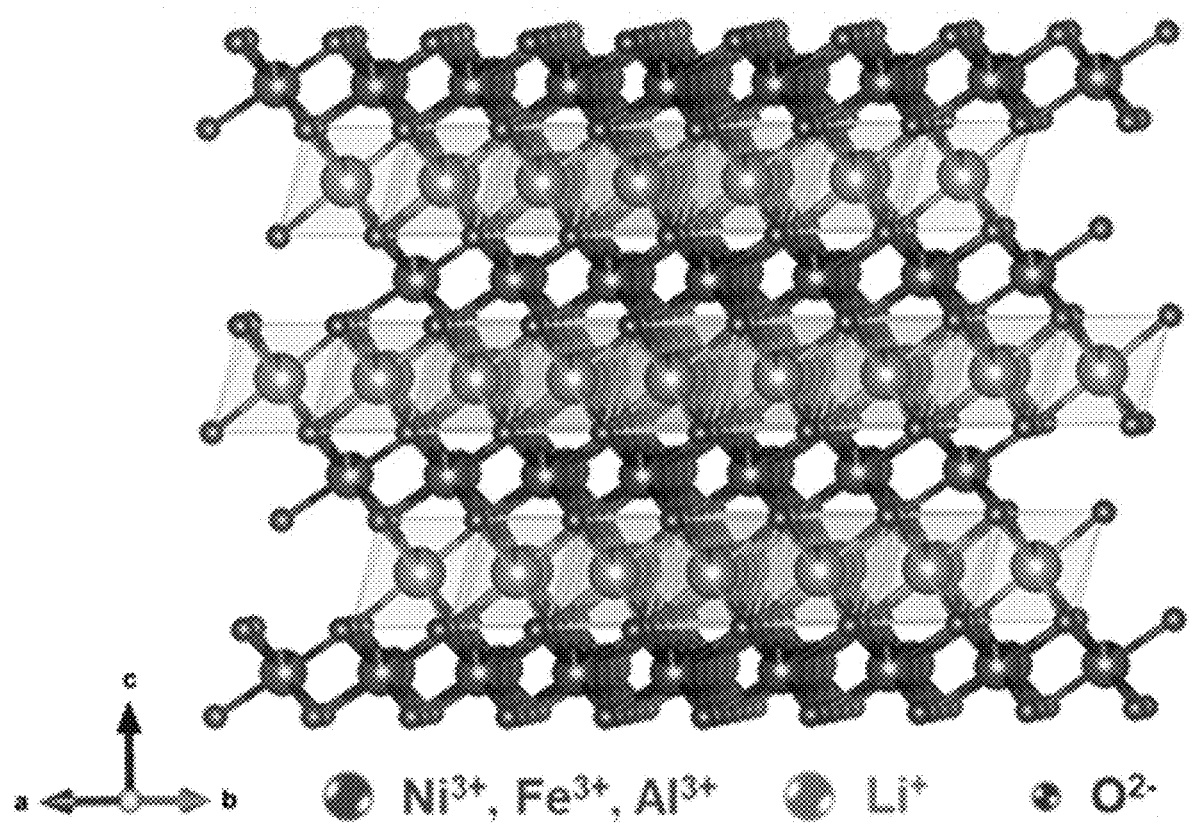
FIG. 4 is a schematic illustrating a crystal structure of various embodiments of the lithium metal oxide of FIG. 1.

As shown in FIG. 4, the NFA-based cathodes with varying amounts of iron and aluminum may exhibit crystal structures in view of calculated lattice parameters, as provided in Table II below.

TABLE II

| Structural Parameters | a | b | c | Volume | α | β | γ |
|---|---|---|---|---|---|---|---|
| NFA 1 | 2.87387 | 2.87387 | 14.227 | 101.227 | 90 | 90 | 120 |
| NFA - F | 2.87776 | 2.87776 | 14.23 | 102.0574 | 90 | 90 | 120 |
| NFA - A | 2.87062 | 2.87062 | 14.2232 | 101.5031 | 90 | 90 | 120 |

Figure 5:
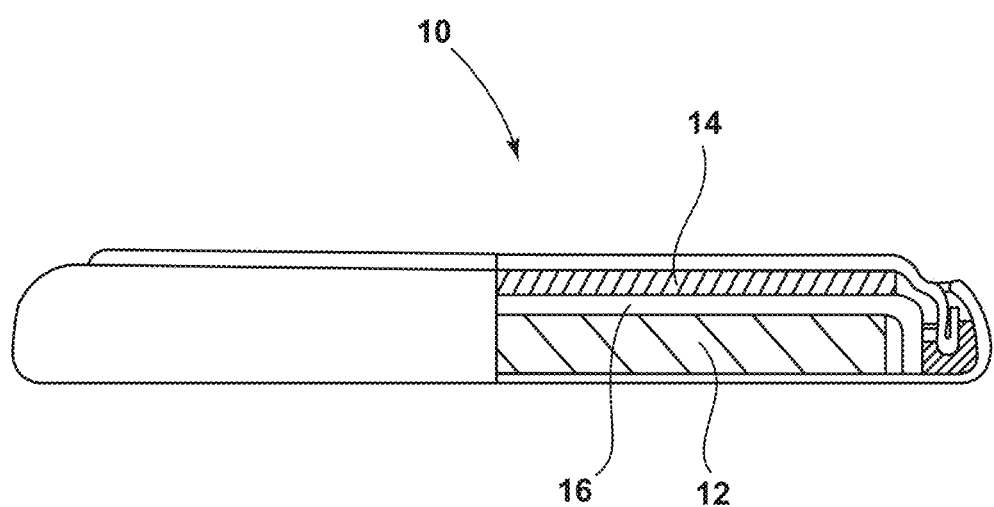
FIG. 5 is a partial cross-sectional view illustrating one embodiment of a battery comprising another lithium metal oxide.

As introduced above, with reference to FIG. 5, a battery 10 is also provided. The battery 10 may comprise a coin cell (e.g. CR2032), a pouch cell, a cylindrical cell, or a combination thereof. A plurality of batteries may be arranged to form a battery pack. The battery 10 may have a capacity in an amount of from about 1 mAh to about 100 Ah, optionally from about 10 mAh to about 10 Ah, or optionally from about 50 mAh to about 5 Ah. The battery 10 comprises the cathode 12 described above, an anode 14, a separator 16, and an electrolyte.

The anode 14 may comprise an anode active material. The anode active material may comprise a metal/metalloid alloyable with lithium, or an alloy or an oxide thereof. For example, the metal/metalloid alloyable with lithium may comprise Ti, Si, Mg, Ca, Sr, Ba, Ra, Sc, Y, Zr, Hf, Rf, V, Nb, Ta, Db, Cr, Mo, W, Sg, Tc, Re, Bh, Fe, Pb, Ru, Os, Hs, Rh, Jr, Pd, Pt, Cu, Ag, Au, Zn, Cd, B, Al, Ga, Sn, In, Tl, Ge, P, As, Sb, Bi, S, Se, Te, Po, or combinations thereof. For example, the oxide of the metal/metalloid alloyable with lithium may be lithium titanium oxide (LTO), vanadium oxide, lithium vanadium oxide, $SnO_2$, $SiO_x$ (0<x<2), or the like.

In various embodiments, the anode active material comprises lithium titanium oxide (LTO). The lithium titanium oxide (LTO) may have a formula according to Formula III:

$$Li_4Ti_5O_{12}(LTO) \qquad III.$$

The anode 12 may be prepared using a method similar to the method used to prepare the cathode, except that an anode active material is used instead of the lithium metal oxide composition in the preparation of the cathode 14 described above. In various embodiments, the anode active material is formed from an anode active material composition (also commonly referred to as an anode slurry). The anode active material composition may comprise a conductive agent, a binder, and a solvent. The conductive agent, a binder, and a solvent may be the same as those of the lithium metal oxide composition of the cathode. The amounts of the anode active material, the conductive agent, the binder, and the solvent utilized to form the anode are the same as those commonly used in lithium batteries.

In certain embodiments, the electrolyte comprises a lithium salt-containing non-aqueous electrolyte. The lithium salt-containing non-aqueous electrolyte may comprise a non-aqueous electrolyte and a lithium salt. The non-aqueous electrolyte may comprise a non-aqueous electrolyte solution, an organic solid electrolyte, or an inorganic solid electrolyte.

In some embodiments, the electrolyte may comprise a mixture of $LiPF_6$, ethylene carbonate (EC), and ethyl methyl carbonate (EMC). The mixture may further comprise an electrolyte additive selected from the group of fluorinated carbonates, anhydrides, sulfones, sulfites, and combinations thereof. Non-limiting examples of suitable electrolyte additives includes fluoroethylene carbonate (FEC), trans-difluoroetyhene carbonate (DFEC), ethylene sulfite (ES), 1,3-propane sultone (PS), and glutaric anhydride (GA), and are shown below:

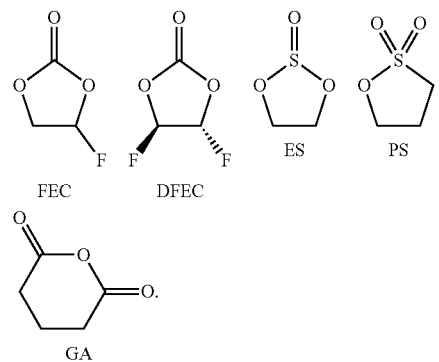

In other embodiments, the non-aqueous electrolyte may comprise an organic solvent. The organic solvent may be any organic solvent commonly used in the art. For example, the organic solvent may comprise propylenecarbonate, ethylene carbonate, fluoroethylenecarbonate, butylenecarbonate, di-methylcarbonate, diethylcarbonate, ethyl methyl carbonate, methyl propylcarbonate, ethyl propylcarbonate, methyl isopropylcarbonate, dipropylcarbonate, dibutylcarbonate, fluoroethylenecarbonate, benzonitrile, acetonitrile, tetrahydrofuran, 2-methyltetrahydrofuran, γ-butyrolactone, dioxorane, 4-methyldioxorane, N,N-dimethylformamide, N,N-dimethylacetamide, dimethylsulfoxide, dioxane, 1,2-dimethoxyethane, sulforane, dichloroethane, chlorobenzene, nitrobenzene, diethyleneglycol, dimethylether, or combinations thereof.

Non-limiting examples of the organic solid electrolyte may include polyethylene derivatives, polyethylene oxide derivatives, polypropylene oxide derivatives, phosphoric acid ester polymers, polyester sulfide, polyvinyl alcohol, polyvinylidene fluoride, and the like. Non-limiting examples of the inorganic solid electrolyte may include $Li_3N$, LiI, $Li_5NI_2$, $Li_3N$—LiI—LiOH, $Li_2SiS_3$, $Li_4SiO_4$, $Li_4SiO_4$—LiI—LiOH, $Li_3PO_4$—$Li_2S$—$SiS_2$, and the like.

The lithium salt may be any lithium salt easily dissolved in the non-aqueous electrolyte, such as $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each independently natural numbers), LiCl, LiI, or combinations thereof. In addition, for example, pyridine, triethylphosphite, triethanolamine, cyclic ether, ethylene diamine, n-glyme, hexamethyl phosphoramide, nitrobenzene derivatives, sulfur, quinone imine dye, N-substituted oxazolidinone, N,N-substituted imidazolidine, ethyleneglycol dialkyl ether, ammonium salt, pyrrole, 2-methoxyethanol, aluminum trichloride, and the like may further be added to the non-aqueous electrolyte to improve charging and discharging characteristics, flame retardancy, and the like. In some cases, a halogen-containing solvent such as carbon tetrachloride and ethylene trifluoride may further be added thereto to provide nonflammability.

A separator 16 is disposed between the cathode 12 and the anode 14. The separator 16 may comprise an insulating thin film having high ion permeability and high mechanical strength. The separator may have a pore diameter in an amount of from about 0.01 to about 10 μm, and a thickness in an amount of from about 5 to about 20 μm. Non-limiting examples of suitable materials for the insulating film include olefin-based polymer, such as polyethylene, polypropylene, polyvinylidene fluoride, or a multilayer film of two or more thereof. Other non-limiting examples include a mixed multilayer film, such as a polyethylene/polypropylene double-layered separator, a polyethylene/polypropylene/polyethylene triple-layered separator, or a polypropylene/polyethylene/polypropylene triple-layered separator. The film may be in the form of a sheet or a nonwoven fabric. In embodiments when a solid polymeric electrolyte is used as an electrolyte, the solid polymeric electrolyte may also serve as a separator 16.

Figure 6:
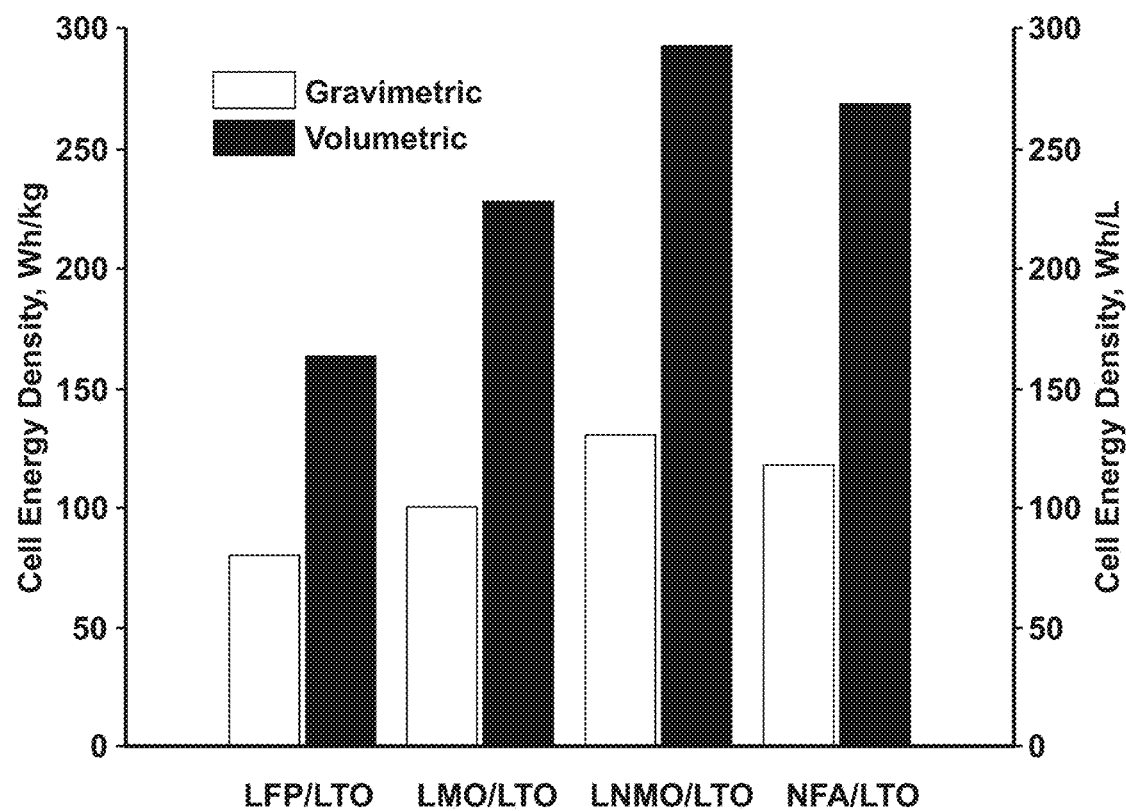
FIG. 6 is a graphical image illustrating performance of one embodiment of the battery of FIG. 5 relative to conventional batteries.

As shown in FIG. 6, a battery comprising an NFA-based cathode and an LTO-based anode exhibits an improved cell energy density, based on both gravimetric (Wh/kg) and volumetric analysis Wh/L, relative to conventional batteries comprising (a) a lithium iron phosphate (LFP)-based cathode and an LTO-based anode or (b) a lithium manganese oxide (LMO)-based cathode and an LTO-based anode.

As also shown in FIG. 6, a battery comprising an LNMO-based cathode and an LTO-based anode exhibits an improved cell energy density, based on both gravimetric (Wh/kg) and volumetric analysis Wh/L, relative to conventional batteries comprising (a) a lithium iron phosphate (LFP)-based cathode and an LTO-based anode or (b) a lithium manganese oxide (LMO)-based cathode and an LTO-based anode.

In an exemplary embodiment, the NFA-based cathodes with varying amounts of iron and aluminum described above may be utilized in 2032 coin cells. The NFA-based cathodes may comprise 80 wt. % as synthesized powder, 10 wt. % PVDF binder, and 10 wt % conductive carbon additive. The electrolyte may be a generation 2 electrolyte and lithium may be the anode.

The NFA-based cathodes with varying amounts of iron and aluminum may be evaluated under cyclic voltammetry (CV) tests at a scan rate of 0.1 m V/s between the voltage window of 2.0 V and 4.5 V. The CVs of the NFA-based cathodes may show Li-ion insertion (cathodic peaks) and extraction (anodic peaks) processes with good reversibility. The voltammograms may be similar to that observed for the conventional cobalt containing commercial layered cathodes such as NCA and NCMs characterized by the dominant nickel redox features with distinct crystallographic transitions. It can be observed that the compositional variant NFA-F when compared to NFA-1 and NFA-A showed faster degradation in redox peak heights suggesting degradation in performance. The variants NFA-1 and NFA-A however, exhibited comparative stability with NFA-A exhibiting minimal degradation in performance.

The NFA-based cathodes with varying amounts of iron and aluminum may be evaluated for charge/discharge behavior at 0.1 C. The NFA-based cathodes may show similar initial capacities of around 200 mAh/g which is comparable to conventional cobalt containing NMCs and NCA type cathode materials synthesized using similar processes.

The NFA-based cathodes with varying amounts of iron and aluminum may be evaluated for cycling behavior using continuous charge/discharge tests at C/3 between 3V and 4.5V. It can be observed that the NFA-A variant showed stable performance and capacity retention when compared to the other two NFA variants.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A cathode comprising a lithium metal oxide, the lithium metal oxide comprising nickel, aluminum, and iron, wherein the lithium metal oxide is substantially free of cobalt, wherein the cathode comprises a primary particle having a surface with the primary particle comprising the lithium metal oxide, and wherein the primary particle comprises an oxide coating disposed on the surface.

2. The cathode of claim 1, wherein the lithium metal oxide the lithium metal oxide has a formula according to Formula I:

$$Li_{1+w}Ni_xFe_yAl_zO_2 \qquad \text{I;}$$

wherein $0 \leq w \leq 0.05$, $0 < x < 1$, $0 < y \leq 0.2$, $0 < z \leq 0.2$, and $x+y+z=1$.

3. The cathode of claim 2, wherein the lithium metal oxide has a formula according to Formula II:

$$LiNi_{0.8}Fe_{0.1}Al_{0.1}O_2 \qquad \text{II.}$$

4. The cathode of claim 1, wherein the iron of the lithium metal oxide is selected from the group of $Fe^{2+}$, $Fe^{3+}$, and combinations thereof.

5. The cathode of claim 4, wherein the iron of the lithium metal oxide comprises $Fe^{3+}$.

6. The cathode of claim 1, wherein the aluminum of the lithium metal oxide comprises $Al^{3+}$.

7. The cathode of claim 1, wherein the cathode comprising iron and substantially free of cobalt exhibits an increase in capacity as compared to a conventional cathode free of iron and comprising cobalt.

8. The cathode of claim 1, wherein the primary particle has a spherical configuration or a hexagonal-shaped nano-plate configuration.

9. The cathode of claim 1, wherein the oxide coating comprises an oxide selected from the group of silicon dioxide, zirconium dioxide, titanium oxide, and a combination thereof.

10. A cathode comprising a lithium metal oxide, the lithium metal oxide comprising nickel, aluminum, and iron, wherein the lithium metal oxide is substantially free of cobalt,
    wherein the cathode comprises a primary particle having a surface with the primary particle comprising the lithium metal oxide,
    wherein the primary particle has a hexagonal-shaped nano-plate configuration, and wherein the cathode may exhibit improved lithium ion diffusion through the primary particle having the hexagonal-shaped nano-plate configuration relative to a primary particle that does not have the hexagonal-shaped plate configuration.

11. A battery comprising: an anode; a cathode comprising a lithium metal oxide, the lithium metal oxide comprising nickel, aluminum, and iron, wherein the lithium metal oxide is substantially free of cobalt, wherein the cathode comprises a primary particle having a surface with the primary particle comprising the lithium metal oxide, and the primary particle comprises an oxide coating disposed on the surface; and an electrolyte.

12. The battery of claim 11, wherein the lithium metal oxide has a formula according to Formula I:

$$Li_{1+w}Ni_xFe_yAl_zO_2 \qquad I;$$

wherein 0≤w≤0.05, 0<x<1, 0<y≤0.2, 0<z≤0.2, and x+y+z=1.

13. The battery of claim 12, wherein the lithium metal oxide has a formula according to Formula II:

$$LiNi_{0.8}Fe_{0.1}Al_{0.1}O_2 \qquad II.$$

14. The battery of claim 11, wherein the anode comprises a lithium titanium oxide.

15. The battery of claim 14, wherein the lithium titanium oxide has a formula according to Formula III:

$$Li_4Ti_5O_{12} \qquad III.$$

16. The battery of claim 11, wherein the electrolyte comprises a mixture of $LiPF_6$, ethylene carbonate, and ethyl methyl carbonate.

17. The battery of claim 16, wherein the mixture further comprises an electrolyte additive selected from the group of fluorinated carbonates, anhydrides, sulfones, sulfites, and combinations thereof.

18. A method of forming the lithium metal oxide of claim 1, the method comprising:
   dissolving lithium, nickel, aluminum, and iron in an aqueous solvent to form a solution;
   heating the solution to a first temperature to form a gel;
   evaporating the aqueous solvent from the gel to form a precursor powder; and
   heating the precursor powder to a second temperature, different than the first temperature, for calcinating the precursor powder to form the lithium metal oxide.

* * * * *